United States Patent
Lilja et al.

(10) Patent No.: US 7,174,132 B2
(45) Date of Patent: Feb. 6, 2007

(54) RF TRANSCEIVER ARRANGEMENT, TERMINAL EMPLOYING THE ARRANGEMENT, AND METHOD FOR FABRICATING TERMINAL ACCORDING TO THE ARRANGEMENT

(75) Inventors: Antti Lilja, Oulunsalo (FI); Markku Kallunki, Oulu (FI)

(73) Assignee: Nokia Corporation, Espoo (FI)

( * ) Notice: Subject to any disclaimer, the term of this patent is extended or adjusted under 35 U.S.C. 154(b) by 573 days.

(21) Appl. No.: 10/684,170

(22) Filed: Oct. 10, 2003

(65) Prior Publication Data

US 2004/0097269 A1 May 20, 2004

(30) Foreign Application Priority Data

Nov. 14, 2002 (FI) .................................. 20022028

(51) Int. Cl.
*H04B 17/00* (2006.01)
(52) U.S. Cl. ............... 455/67.11; 455/423; 455/424; 455/67.14; 455/562.1; 455/103; 348/63; 375/219
(58) Field of Classification Search ............... 455/423, 455/424, 67.11, 67.14, 562.1, 103, 462
See application file for complete search history.

(56) References Cited

U.S. PATENT DOCUMENTS

| | | | |
|---|---|---|---|
| 5,640,444 A * | 6/1997 | O'Sullivan ............ 455/552.1 |
| 6,658,269 B1 * | 12/2003 | Golemon et al. ........ 455/562.1 |
| 6,687,499 B1 * | 2/2004 | Numminen et al. ........ 455/423 |
| 6,697,604 B1 * | 2/2004 | Rimpela et al. .......... 455/67.14 |
| 6,832,075 B1 * | 12/2004 | Henry, Jr. ................ 455/226.1 |
| 6,915,111 B2 * | 7/2005 | Chen et al. ............... 455/67.11 |
| 2002/0025608 A1 | 2/2002 | Shinonaga et al. .......... 438/127 |

OTHER PUBLICATIONS

Patent Abstracts of Japan, "Inspection Method for Characteristic of RF Circuit of Communication Device", Pub. No. 09-257852, Pub. Date Oct. 3, 1997, Kenwood Corp.

* cited by examiner

*Primary Examiner*—Marceau Milord
(74) *Attorney, Agent, or Firm*—Harrington & Smith, LLP

(57) ABSTRACT

The invention relates to a circuit arrangement in association with the RF unit of a wireless terminal, in which circuit arrangement the RF unit and the antenna (3) of the wireless terminal are fabricated/mounted on the same circuit board (1) and where the antenna (3) is connected to the RF unit through at least one signal line (2). In the circuit arrangement, the signal line (2) from the RF unit to the antenna (3) is electrically connected during the final assembly by means of a jumper (5) which is fabricated as part of a mechanical component (6) belonging to the terminal. With the arrangement according to the invention, the RF unit can be tested without interference from the antenna.

11 Claims, 3 Drawing Sheets

_(1)_

RF TRANSCEIVER ARRANGEMENT, TERMINAL EMPLOYING THE ARRANGEMENT, AND METHOD FOR FABRICATING TERMINAL ACCORDING TO THE ARRANGEMENT

FIELD OF THE INVENTION

The invention relates to a circuit arrangement relating to the RF unit of a wireless terminal, in which circuit arrangement the RF unit and the antenna of the terminal are integrated on the same circuit board and where the antenna can be connected to the RF unit through at least one signal line. The invention also relates to a cellular terminal employing the circuit arrangement, and a method of fabricating a cellular terminal.

BACKGROUND OF THE INVENTION

In the field of telecommunication devices there is a tendency to integrate electrical circuits into entities containing as many functions as possible. Through integration it has been possible to reduce or completely eliminate the need for manual installation of discrete components. This means lower manufacturing costs for products. Because of integration, sizes of wireless cellular terminals have been reduced from kilograms down to a few dozen grams at best. However, integration involves some new problems. Testing of large electrical circuit entities becomes complex and difficult to implement. This may increase a product's manufacturing costs.

One target for integration has been the wireless terminal's radio-frequency part, or RF unit, and the antenna arrangement accompanying it. The RF unit proper and the antenna connected therewith used to be two physically separate components, fabricated as discrete elements. They were mechanically and electrically interconnected in the final assembly of the terminal. Thus it was easy to test them both separately. Now these once-discrete components may constitute a single electrical entity fabricated on/connected to one printed circuit board, connected to the other parts of the terminal during the manufacturing process. In such a solution, also the antenna used by the terminal is, prior to the final assembly, fabricated on/connected to the printed circuit board which serves as a base for the RF unit. However, this solution, which as such is advantageous from the cost standpoint, results in that it is difficult to test the RF unit alone, because the antenna, which now is in constant electrical contact therewith, always affects the measurement results obtained.

One possible solution for the aforementioned problem is to connect to the PCB a special measurement connector between the RF unit proper and the antenna circuit.

One possible solution for the aforementioned problem is to connect to the PCB a special measurement connector between the RF unit proper and the antenna circuit. This measurement connector provides a direct connection to the RF unit output so that the antenna will not affect the measurement results. This way, the operation of the RF unit can be tested direct at the output thereof. If the RF unit is not operating as it should, it can be repaired right away, if possible, and the test can be then repeated. This solution, however, is not cost-efficient as the special measurement connector is expensive and requires installation work. Moreover, reliability problems are known to be associated with the measurement connectors used.

Operation of the RF unit may naturally be tested together with the antenna arrangement attached to it. In that case the measuring instrument must be connected in parallel with the antenna of the terminal, using electromagnetic coupling of some sort. It is known that antenna operation is affected by all components, especially those containing metals, in its vicinity. Therefore, in this measuring arrangement the terminal has to be assembled, at least for those components that are regarded as affecting the radiation characteristics of the antenna. If testing indicates erroneous operation of the RF unit, the already-installed other mechanical parts/components of the terminal have to be removed before actual repair can be done. After the repair, the terminal must again be assembled for re-testing. Such a procedure takes time and increases testing costs.

SUMMARY OF THE INVENTION

An object of the invention is to provide a circuit arrangement on a single printed circuit board for a cellular terminal, comprising a RF unit and an antenna in connection therewith, where the electrical characteristics of the RF unit can be tested as a separate entity despite the fact that the RF unit and the antenna to be electrically connected with it are fabricated/mounted on one and the same printed circuit board. This solution also means that no extra assembly stages are needed in the manufacturing process.

The objects of the invention are achieved by an arrangement in which the signal line from the RF unit output to the antenna on the printed circuit board of a cellular terminal is cut off. The signal line is electrically connected in the final assembly of the terminal using a jumper attached to a mechanical part of the terminal. Electrical coupling of the RF unit and antenna is done by installing a component which would be mounted in the terminal anyway in the final assembly. With this arrangement the RF unit can be measured/tested separately without the accompanying antenna prior to the final assembly of the terminal.

An advantage of the invention is that there is no need to install on the printed circuit board a special measurement connector for measuring the electrical characteristics of the RF unit. This reduces the device's manufacturing costs.

Another advantage of the invention is that the results of measurements are more reliable than those obtained using a specially installed measurement connector.

Another advantage of the invention is that the necessary measurements can be performed quickly using ordinary probes at hand, without having to attach a special probe to the measurement connector, which takes time.

A further advantage of the invention is that the RF unit can be tested before other mechanical parts of the terminal affecting the operation of the antenna are installed in the terminal.

The arrangement according to the invention is characterized in that which is specified in the independent claims.

Some preferred embodiments of the invention are specified in the dependent claims.

The underlying idea of the invention is as follows: A signal line fabricated on a printed circuit board, coming from a RF unit and going to an antenna fabricated/mounted on the same printed circuit board is cut off before the antenna. A cutoff signal line end at the RF unit side can be used as a measurement point in tests/measurements. As the antenna circuit according to the invention is electrically isolated from the RF unit, the antenna will not interfere with the measurements, and the measurement results obtained will be reliable. In the final assembly of the terminal the cut-off signal line is electrically re-connected advantageously using a jumper. This jumper is preferably attached to some other mechanical part in the terminal. When this mechanical part is installed during the final assembly, the jumper electrically re-connects the cut-off signal line between the RF unit and the antenna.

BRIEF DESCRIPTION OF THE DRAWINGS

The invention is below described in detail. The description makes reference to the accompanying drawings in which.

DETAILED DESCRIPTION OF THE PREFERRED EMBODIMENTS

Figure 1:
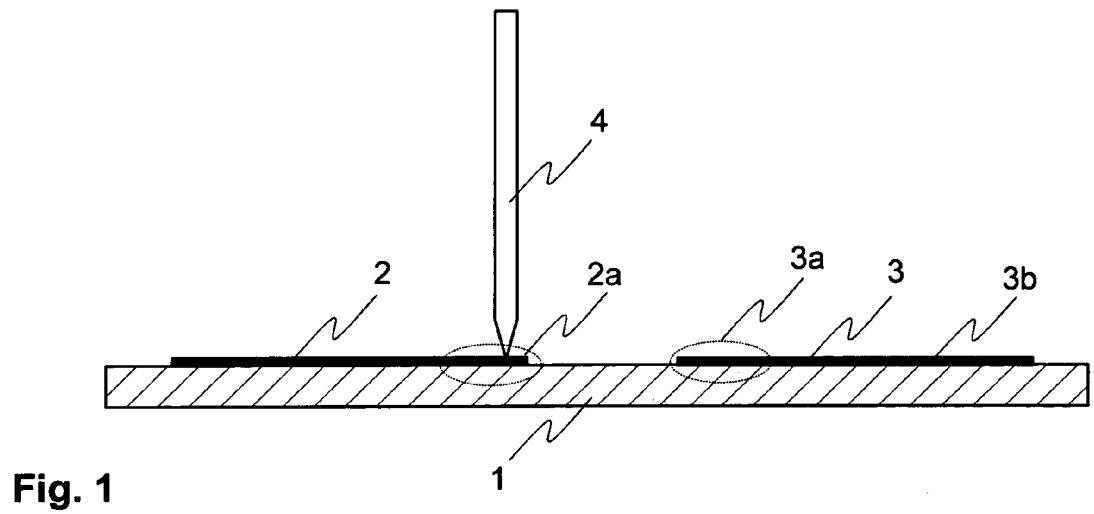
FIG. 1 shows, as an example, a measurement event in the arrangement according to the invention.

FIG. 1 shows, as an example, the circuit arrangement according to the invention in connection with the RF part of a terminal. Reference designator 1 represents a printed circuit board on which the RF unit is fabricated or mounted. Reference designator 2 represents a signal line coming from the output of the RF unit, meant to be connected to the antenna, which in the exemplary embodiment of FIG. 1 is an integrated antenna 3 on the printed circuit board 1. Alternatively, the antenna may also be an antenna module soldered or mechanically coupled onto the printed circuit board 1. In that case, reference designator 3b in FIG. 1 represents a signal line leading to the antenna module. FIG. 1 does not show the RF unit proper or possible antenna modules. Reference designator 4 in FIG. 1 represents a probe in a measuring instrument used in the testing of the RF unit. The probe 4 may advantageously be a simple touch-based probe. In that case the probe 4 need not be attached to the signal line 2 coming from the RF unit, or to a special connector coupled thereto. Likewise, FIG. 1 shows that in the arrangement according to the invention there is no electrical connection between the RF unit and the antenna 3 or the signal line 3b leading to an antenna module. Thus the antenna fabricated/mounted on the printed circuit board will not affect the results of measurements performed on the RF unit.

Furthermore, using the arrangement according to the invention, the measurement/testing of the RF unit is easily made automatic, because to perform the measurement it is only necessary to get the probe 4 of a measuring instrument in electric contact with the signal line 2. This can be advantageously performed at a measuring pad 2a at the end of the signal line 2. The measurement having been completed, the probe 4 is removed from the measuring pad 2a and the RF unit, if it has been found OK, can be taken to the final assembly.

Figure 2:
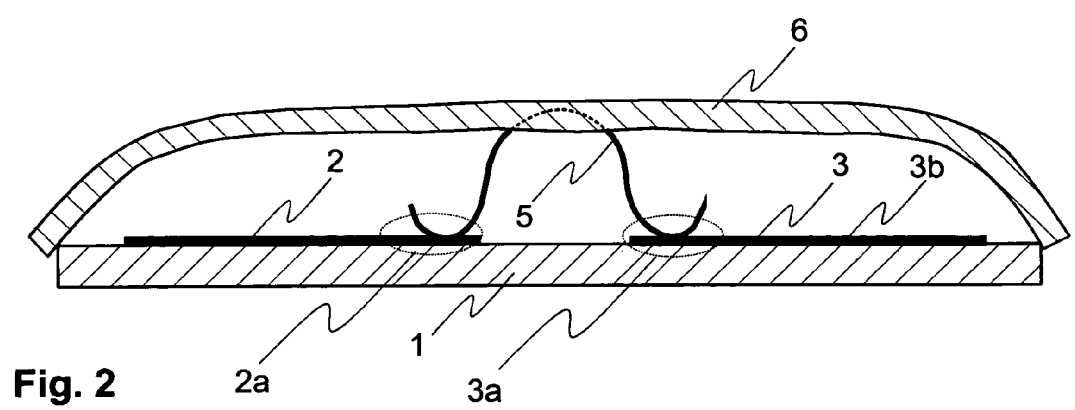
FIG. 2 shows, as an example, the utilization of a jumper in the arrangement according to the invention.

FIG. 2 shows, as an example, a partial cross section of an assembled terminal. A signal line 2 and antenna 3 or alternatively a signal line 3b leading to an antenna module are electrically interconnected through a jumper 5 between a measuring pad 2a and a contact pad 3a at the end of the antenna signal line. In the example case of FIG. 2 the jumper 5 is attached to a part that represents the housing 6 of the terminal. If the part 6 in FIG. 2 is manufactured by means of injection molding, part of the jumper 5 remains within the injection-molded part 6. When the part/housing 6 is installed, the jumper 5 is positioned, in accordance with FIG. 2, such that the measuring pad 2a and contact pad 3a are brought into electric contact with each other, as desired. Naturally the jumper 5 according to the invention can be attached to any mechanical part used in the final assembly. The jumper 5 may also be implemented such that an attachment mechanism in it makes possible to install the jumper as a discrete component on the printed circuit board during the final assembly.

Figure 3:
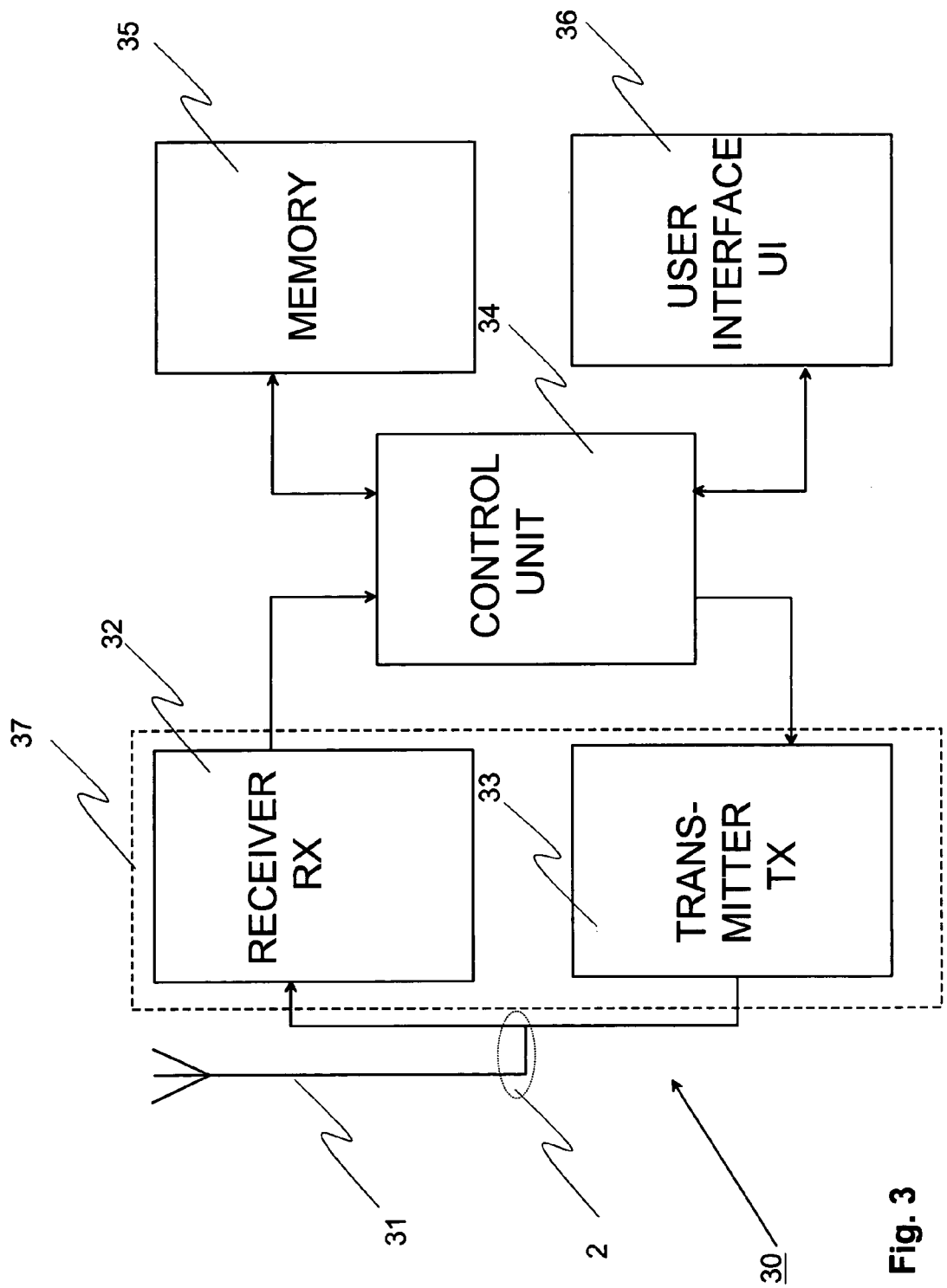
FIG. 3 shows, as an example, functional parts of a terminal employing the invention.

FIG. 3 shows, as an example, the main functional components of a cellular terminal 30 employing the circuit arrangement according to the invention. The terminal 30 uses an antenna 31 for transmitting and receiving information. The antenna 31 is connected through a signal line 2 to a RF unit 37. Reference designator 32 represents the means that constitute the receiver RX in the terminal 30 through which the wireless terminal 30 receives messages from the cellular network. Reference designator 33 represents the means that constitute the transmitter TX in the wireless terminal 30. The transmitter means TX 33 perform on the signal to be transmitted all the necessary signal processing measures required when communicating with a cellular network. The RF unit 37 in the terminal 30 thus comprises the both aforementioned units: the receiver RX, reference designator 32, and the transmitter TX, reference designator 33.

Operation of the terminal 30 is controlled by a control unit 34. It controls the operation of all the main parts belonging to the terminal 30. It controls both reception and transmission. It is further used to control the user interface UI 36 and the memory 35. The software applications required by the control unit 34 advantageously reside in the memory 35. The user interface UI 36 is utilized in the control of the terminal's functions.

From the point of view of the invention, the crucial unit in the terminal 30 is the RF unit 37, which comprises the receiver RX 32, and the transmitter TX 33. Both of these units process radio-frequency signals. These units 32, 33 can be implemented either separately or as a single circuit entity.

If the RF unit 37 is realized in two discrete circuit entities, both the transmitter TX and receiver RX can separately employ a circuit arrangement according to the invention with separate signal lines 2 and measuring pads 2a and contact pads 3a.

In the case of two discrete units, a terminal 30 according to the invention is first assembled to such an extent that all the necessary operating and control voltages can be connected to the RF unit 37. After that, the necessary test signal is supplied to the RF unit 37. When testing the transmitter TX 33, a desired test signal is brought to the baseband input of the RF unit 37. Thus the output of the transmitter TX 33 in the RF unit 37 gives a signal which can be taken to a measuring instrument through a probe 4 placed in contact with the measuring pad 2a.

Similarly, when testing the receiver RX 32 in the RF unit 37, the necessary test signal is supplied to the receiver RX 32 through a measuring pad 2a in the receiver RX 32. The signal processed by the RF unit 37 can be taken to a measuring instrument from the baseband output of the RF unit 37.

If the RF unit 37 is a single integrated circuit, then there is advantageously only one signal line 2, leading to the antenna 3, 31. The terminal 30 uses this signal line 2 both in transmission and reception. When testing the receiver RX 32 in the terminal 30, the necessary test signal is supplied to the receiver RX 32 via the measuring pad 2a. The signal to the measuring instrument is obtained from the baseband output of the RF unit.

The same measuring pad 2a can also be used as a measuring point for the signal output from the RF unit 37, when testing the transmitter TX 33 of the RF unit 37 in the terminal 30. Then the necessary input signal is supplied to the RF unit 37 via its baseband input port.

Figure 4:
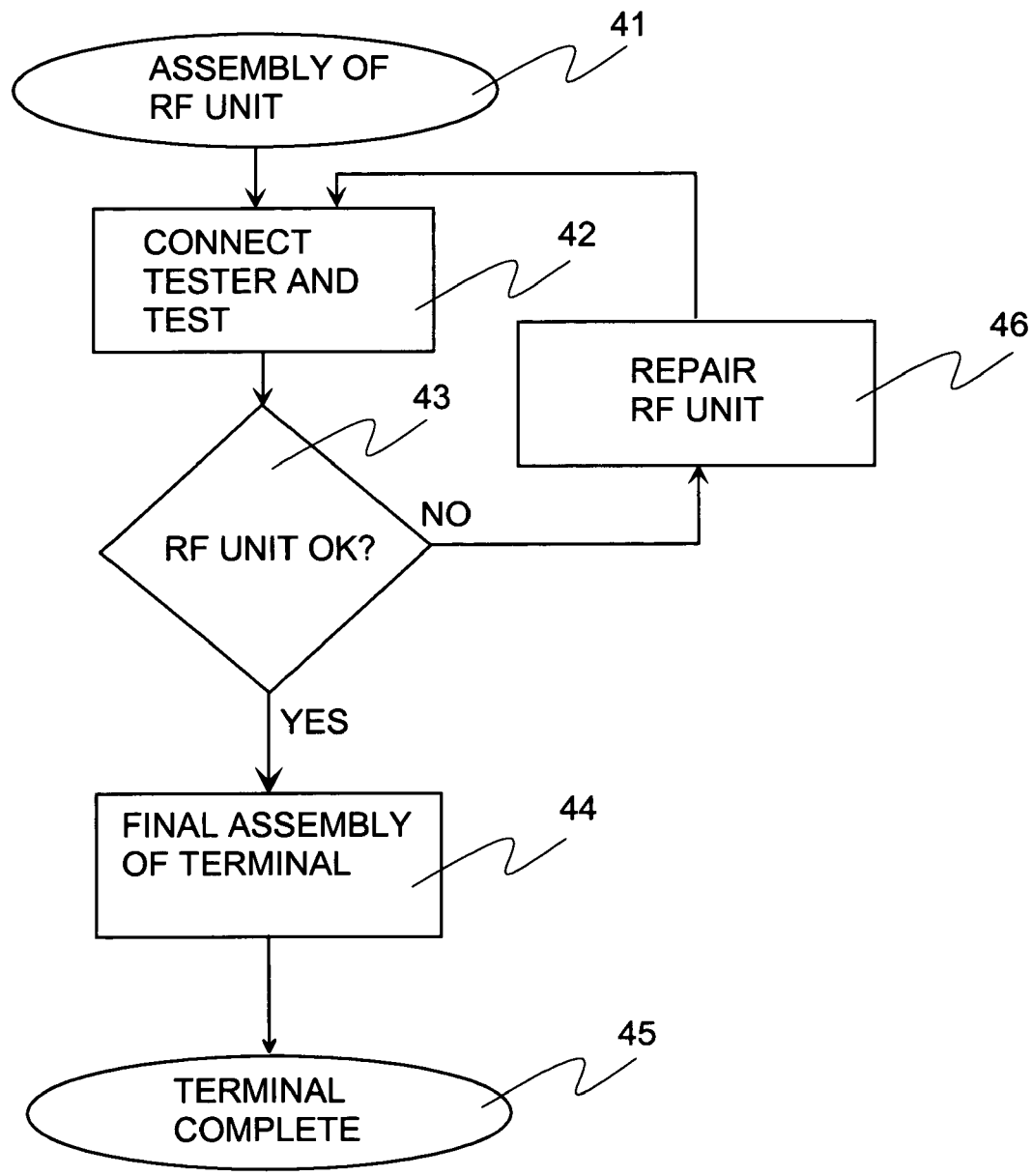
FIG. 4 shows, as an example, a flow diagram illustrating the utilization of the circuit arrangement according to the invention in the assembly and testing of a terminal.

FIG. 4 shows, as an example, a flow diagram illustrating the effect of the circuit arrangement according to the invention on the manufacturing and testing process of a terminal. In state 41 the RF unit 37 of a terminal has been assembled into a functioning unit on a printed circuit board 1. On the same printed circuit board 1 there has been fabricated/mounted an antenna 3, 31 used by the terminal 30. However, the signal line 2 from the RF unit to the antenna 3, 31 has been cut off between the measuring pad 2a and contact pad 3a.

In step 42 a test equipment is connected to the terminal 30. A probe 4 belonging to a measuring instrument is placed in contact with the measuring pad 2a. A test or tests are run as required. The antenna 3, 31 of the terminal 30 does not affect the measurement results obtained from the test(s).

In step 43 it is examined whether the RF unit 37 meets the requirements. If not, it can be repaired in step 46. In that case, following step 46, the RF unit 37 is re-tested in the manner specified in step 42. If, in step 43, it is verified that the RF unit 37 functions correctly, it is transferred to the final assembly.

Final assembly of the terminal 30 takes place in step 44. At this stage the terminal is advantageously completely assembled, so that it will be ready for packaging. During the final assembly, at least one measuring pad 2a and contact pad 3a are interconnected through an electrically conductive jumper 5. This way, the RF unit 37 is advantageously electrically connected with the antenna 3, 31. The jumper 5 is preferably attached to some other part 6 of the terminal, installed in the terminal 30 in the final assembly. As this part 6 is installed, the jumper 5 is placed at its specified position and electrically connects the signal line 2 between the measuring pad 2a and contact pad 3a. After that, the terminal 30 is ready for packaging, state 45.

Some preferred embodiments according to the invention were described above. The invention is not limited to the embodiments just described. The inventional idea can be applied in numerous ways within the scope defined by the attached claims.

What is claimed is:

1. A circuit arrangement associated with a RF unit of a wireless terminal for testing the RF unit prior to final assembly, in which circuit arrangement the RF unit and an antenna of the wireless terminal are fabricated/mounted on a common printed circuit board and in which the antenna is arranged so as to be connected with the RF unit through at least one signal line, where in said signal line is at least one break for electrically isolating the antenna from the RF unit and that the signal line is arranged to be connected across the break by means of a jumper during the assembly of the terminal.

2. The circuit arrangement according to claim 1, wherein said break in the signal line is located between a measuring pad and contact pad.

3. The circuit arrangement according to claim 1, wherein said jumper is part of a mechanical component to be installed in the wireless terminal during the final assembly.

4. The circuit arrangement according to claim 1, wherein said jumper is a discretely mounted component.

5. A cellular terminal comprising control means for the terminal, an antenna, a RF unit, and a means for testing the RF unit prior to the final assembly of the terminal, where the means for testing the RF unit comprises a signal line from the RF unit to the antenna, which signal line has a break in it for electrically isolating the antenna from the RF unit, and which break is arranged so as to be electrically connected through a jumper during the assembly of the terminal.

6. The terminal according to claim 5, wherein the break in the signal line is located between a measuring pad and contact pad.

7. The terminal according to claim 5, wherein said jumper is part of a mechanical component to be installed in the cellular terminal during assembly.

8. A manufacturing method for a cellular terminal, where a RF unit of a cellular terminal and an antenna of the cellular terminal are fabricated/mounted on a same printed circuit board and in which manufacturing method the RF unit is tested prior to a final assembly, and in which manufacturing method at least one break is made in a signal line traveling from the RF unit to the antenna, between a measuring pad and contact pad for electrically isolating the antenna from the RF unit, during measurements on the RF unit.

9. The manufacturing method according to claim 8, wherein the break between the measuring pad and contact pad is electrically connected by means of a jumper.

10. The manufacturing method according to claim 9, wherein the jumper is attached to a mechanical part in the terminal which, when installed in the final assembly, causes the jumper to electrically connect the measuring pad and contact pad.

11. The manufacturing method according to claim 9, wherein the jumper is mounted as a discrete component on the printed circuit board by means of an attachment mechanism in the jumper.

* * * * *